(12) United States Patent
LoRicco

(10) Patent No.: US 10,746,026 B2
(45) Date of Patent: Aug. 18, 2020

(54) GAS TURBINE ENGINE AIRFOIL WITH COOLING PATH

(71) Applicant: United Technologies Corporation, Farmington, CT (US)

(72) Inventor: Nicholas M. LoRicco, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 15 days.

(21) Appl. No.: 15/863,289

(22) Filed: Jan. 5, 2018

(65) Prior Publication Data
US 2019/0211686 A1 Jul. 11, 2019

(51) Int. Cl.
*F01D 5/18* (2006.01)
*F02C 3/04* (2006.01)

(52) U.S. Cl.
CPC .............. *F01D 5/186* (2013.01); *F01D 5/187* (2013.01); *F01D 5/188* (2013.01); *F02C 3/04* (2013.01); *F05D 2240/126* (2013.01); *F05D 2260/202* (2013.01)

(58) Field of Classification Search
CPC .......... F01D 5/186; F01D 5/188; F01D 5/189; F01D 5/187; F02C 3/04; F05D 2260/202
USPC .................................. 415/115, 116; 416/96 R
See application file for complete search history.

(56) References Cited

U.S. PATENT DOCUMENTS

| | | | | |
|---|---|---|---|---|
| 3,628,880 A * | 12/1971 | Smuland | ................ | F01D 5/189 415/175 |
| 3,806,276 A * | 4/1974 | Aspinwall | ............... | F01D 5/189 416/97 R |
| 4,183,716 A | 1/1980 | Takahara et al. | | |
| 4,252,501 A | 2/1981 | Peill | | |
| 4,297,077 A * | 10/1981 | Durgin | ................... | F01D 5/189 416/97 R |
| 4,946,346 A * | 8/1990 | Ito | .......................... | F01D 5/189 415/115 |
| 5,320,485 A * | 6/1994 | Bourguignon | .......... | F01D 5/187 415/115 |
| 5,711,650 A * | 1/1998 | Tibbott | ................... | F01D 5/186 415/115 |
| 6,742,991 B2 * | 6/2004 | Soechting | ............... | F01D 5/186 416/96 A |
| 7,497,655 B1 | 3/2009 | Liang | | |

(Continued)

FOREIGN PATENT DOCUMENTS

| EP | 1380724 | 1/2004 |
|---|---|---|
| EP | 2975217 | 1/2016 |

OTHER PUBLICATIONS

EP Search Report for EP Application 19150561.9 date of completion May 15, 2019.

*Primary Examiner* — Woody A Lee, Jr.
*Assistant Examiner* — Michael L Sehn
(74) *Attorney, Agent, or Firm* — Carlson, Gaskey & Olds, P.C.

(57) ABSTRACT

A gas turbine engine component includes an airfoil that includes a trailing edge feed cavity. A baffle is located in the trailing edge feed cavity and includes a plurality of pressure side cooling openings in fluid communication with a corresponding one of a plurality of pressure side cooling passages. A plurality of suction side cooling openings are in fluid communication with a corresponding one of a plurality of suction side cooling passages.

13 Claims, 4 Drawing Sheets

(56) References Cited

U.S. PATENT DOCUMENTS

| | | | | |
|---|---|---|---|---|
| 7,789,625 B2* | 9/2010 | Liang | ............... | F01D 5/186 |
| | | | | 415/115 |
| 7,921,654 B1* | 4/2011 | Liang | ............... | F01D 5/186 |
| | | | | 415/115 |
| 8,662,844 B2* | 3/2014 | Hada | ............... | F01D 5/189 |
| | | | | 416/96 A |
| 2004/0009066 A1* | 1/2004 | Soechting | ............... | F01D 5/186 |
| | | | | 416/96 R |
| 2008/0240919 A1 | 10/2008 | Liang | | |
| 2014/0037429 A1* | 2/2014 | Okita | ............... | F01D 5/186 |
| | | | | 415/115 |
| 2014/0075947 A1* | 3/2014 | Gautschi | ............... | F01D 5/189 |
| | | | | 60/726 |
| 2015/0285096 A1* | 10/2015 | Spangler | ............... | F01D 9/02 |
| | | | | 415/115 |
| 2016/0097286 A1* | 4/2016 | Tibbott | ............... | F01D 5/188 |
| | | | | 415/1 |
| 2016/0102563 A1* | 4/2016 | Spangler | ............... | F01D 5/189 |
| | | | | 415/115 |
| 2017/0145833 A1* | 5/2017 | Thornton | ............... | F01D 5/187 |
| 2017/0298762 A1* | 10/2017 | Spangler | ............... | F01D 5/186 |
| 2018/0230814 A1* | 8/2018 | Spangler | ............... | F01D 5/187 |
| 2018/0291742 A1* | 10/2018 | Hoffman | ............... | F01D 5/187 |
| 2019/0101011 A1* | 4/2019 | Marsh | ............... | F01D 5/186 |

* cited by examiner

GAS TURBINE ENGINE AIRFOIL WITH COOLING PATH

BACKGROUND

This disclosure relates generally to a gas turbine engine, and more particularly to a component that can be incorporated into a gas turbine engine. The component can include a vane.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Both the compressor and turbine sections of a gas turbine engine may include alternating rows of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes prepare the airflow for the next set of blades. In turning the airflow for the next set of blades, the turbine vanes must be resilient to the high gas temperatures.

SUMMARY

In one exemplary embodiment, a gas turbine engine component includes an airfoil that includes a trailing edge feed cavity. A baffle is located in the trailing edge feed cavity and includes a plurality of pressure side cooling openings in fluid communication with a corresponding one of a plurality of pressure side cooling passages. A plurality of suction side cooling openings are in fluid communication with a corresponding one of a plurality of suction side cooling passages.

In a further embodiment of any of the above, the plurality of suction side cooling passages extend between opposing radial ends of the airfoil.

In a further embodiment of any of the above, a platform supports the airfoil and has a platform cooling passage that is in fluid communication with at least one of the plurality of suction side cooling passages.

In a further embodiment of any of the above, the platform cooling passage is in fluid communication with a plurality of platform cooling holes.

In a further embodiment of any of the above, the plurality of suction side cooling passages are at least partially defined by the baffle, a suction sidewall of the airfoil, and at least one rib that extend from the suction sidewall of the airfoil.

In a further embodiment of any of the above, the airfoil includes at least one trailing edge cooling hole that is in fluid communication with at least one of the plurality of pressure side cooling passages.

In a further embodiment of any of the above, a plurality of pressure side cooling holes extend through a pressure side of the airfoil and are in fluid communication with at least one of the plurality of pressure side cooling passages.

In a further embodiment of any of the above, the plurality of pressure side cooling passages extend in an axial direction.

In a further embodiment of any of the above, the plurality of suction side cooling passages extend in an axial direction and have an inlet to the suction side cooling passage upstream of an outlet to the suction side cooling passage.

In a further embodiment of any of the above, the plurality of suction side cooling openings are at least partially defined by the baffle, a suction sidewall of the airfoil, and at least one rib that extend from the suction sidewall of the airfoil.

In a further embodiment of any of the above, the airfoil includes at least one trailing edge cooling hole that is in fluid communication with at least one of the plurality of suction side cooling passages.

In a further embodiment of any of the above, a plurality of pressure side cooling holes extend through a pressure side of the airfoil and are in fluid communication with at least one of the plurality of pressure side cooling passages.

In another exemplary embodiment, a gas turbine engine includes a compressor section. A combustor section is in fluid communication with the compressor section. A turbine section is in fluid communication with the combustor section. One of the compressor section or the turbine section includes at least one component that includes an airfoil that includes a trailing edge feed cavity. A baffle is located in the trailing edge feed cavity and includes a plurality of pressure side cooling openings in fluid communication with a corresponding one of a plurality of pressure side cooling passage. A plurality of suction side cooling openings are in fluid communication with a corresponding one of a plurality of suction side cooling passages.

In a further embodiment of any of the above, the plurality of suction side cooling passages are at least partially defined by the baffle, a suction sidewall of the airfoil. and at least one rib that extend from the suction sidewall of the airfoil. The plurality of suction side cooling passages extend between opposing radial ends of the airfoil.

In a further embodiment of any of the above, a platform supports the airfoil and has a platform cooling passage that is in fluid communication with at least one of the plurality of suction side cooling passages.

In a further embodiment of any of the above, the airfoil includes at least one trailing edge cooling hole that is in fluid communication with at least one of the plurality of suction side cooling passages.

In a further embodiment of any of the above, a plurality of pressure side cooling holes extend through a pressure side of the airfoil and are in fluid communication with at least one of the plurality of pressure side cooling passages. The plurality of pressure side cooling passages extend in an axial direction.

In a further embodiment of any of the above, the plurality of suction side cooling passages extend in an axial direction and have an inlet to the suction side cooling passage upstream of an outlet to the suction side cooling passage.

In a further embodiment of any of the above, the plurality of suction side cooling openings are at least partially defined by the baffle, a suction sidewall of the airfoil, and at least one rib that extend from the suction sidewall of the airfoil.

In a further embodiment of any of the above, the airfoil includes at least one trailing edge cooling hole that is in fluid communication with at least one of the plurality of suction side cooling passages.

DETAILED DESCRIPTION

Figure 1:
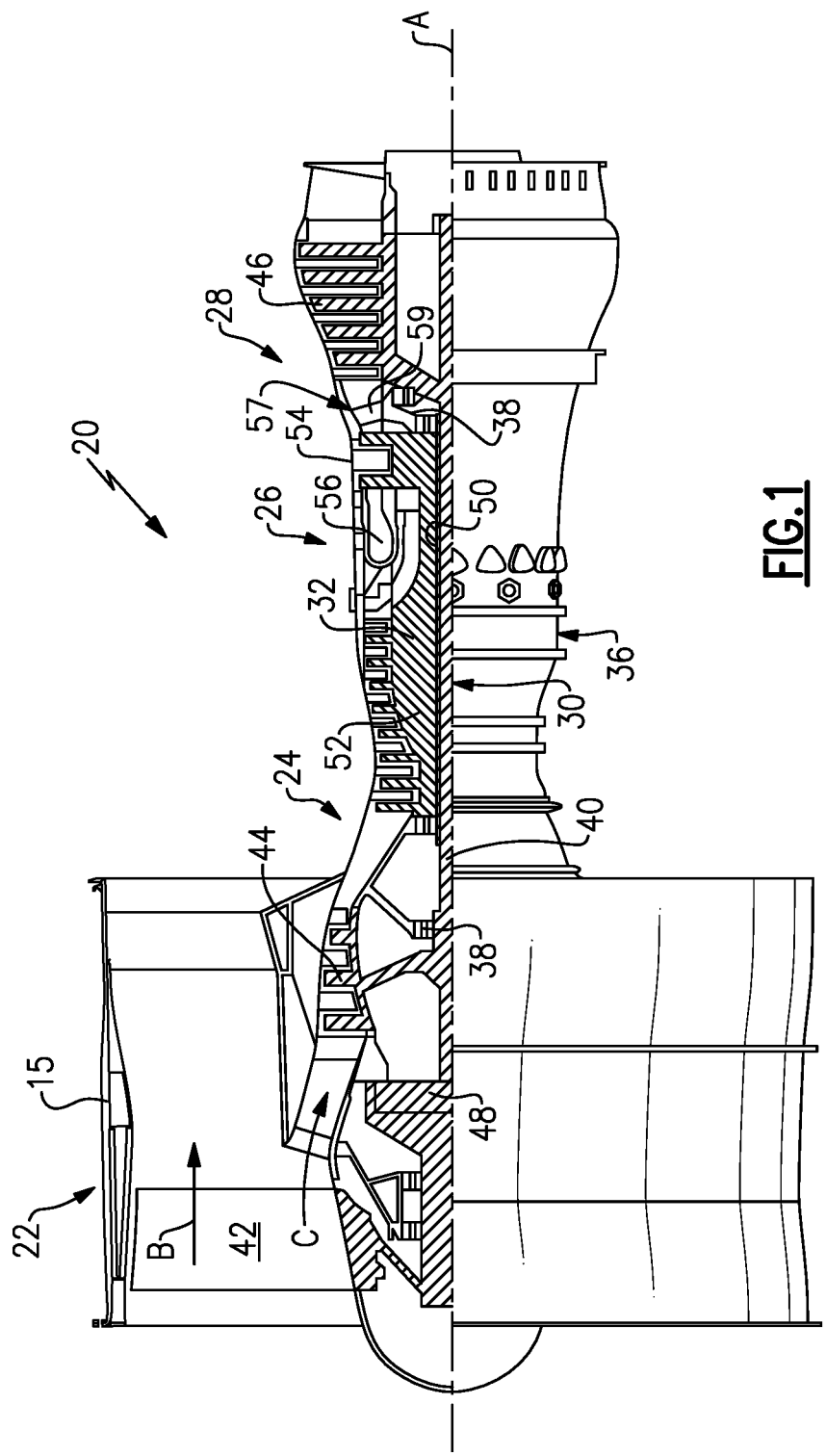
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
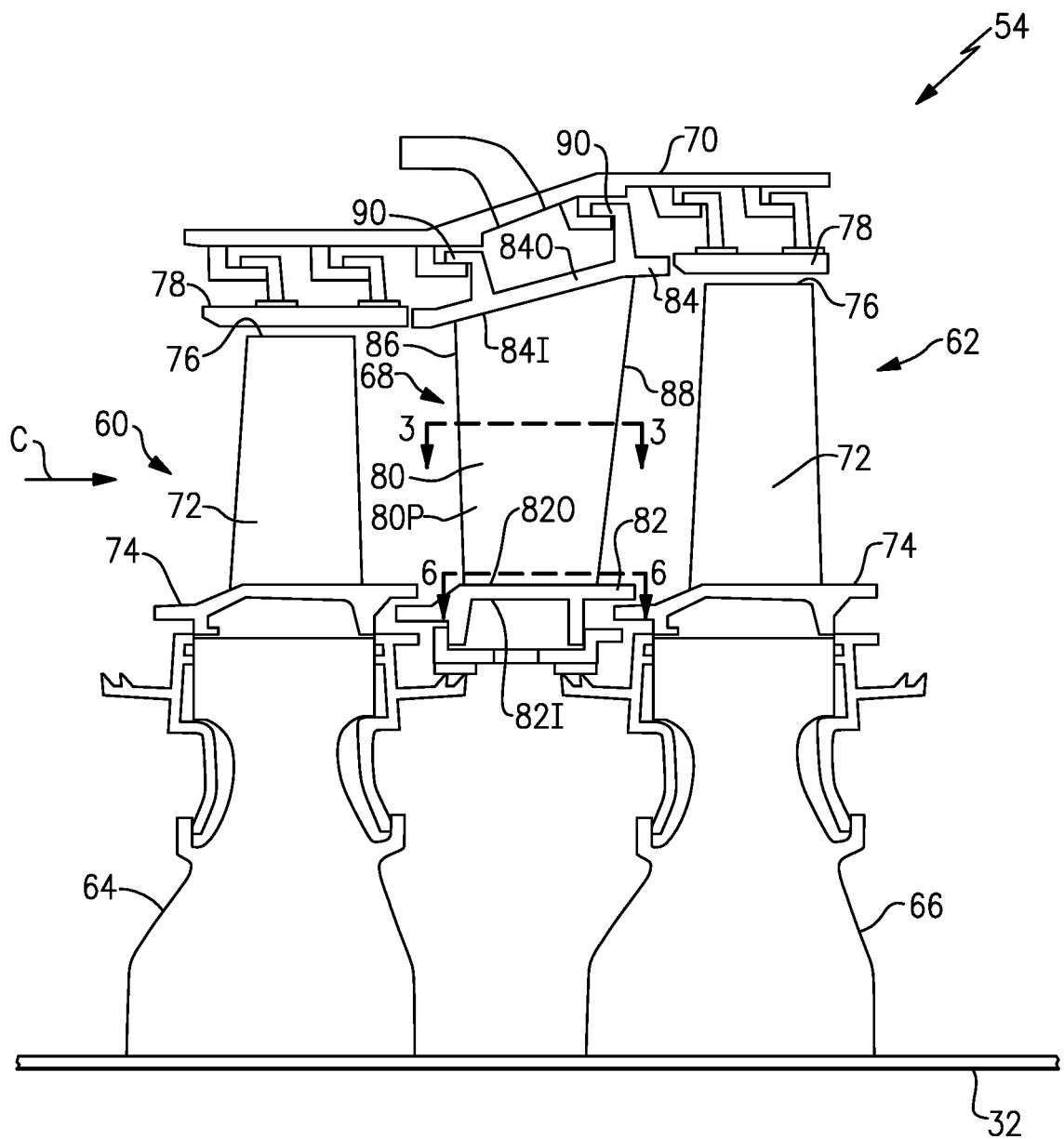
FIG. 2 is a schematic view of a section of the gas turbine engine of FIG. 1, such as a turbine section.

FIG. 2 illustrates a cross-sectional view through a high pressure turbine section 54. In the example high pressure turbine section 54, first and second arrays of rotating blades 60, 62 are axially spaced apart from one another around first and second rotor disks 64, 66, respectively. An array of vanes 68 are located axially between the first and second arrays of blades 60, 62. The first and second arrays of blades 60, 62 and the array of vanes 68 are spaced radially inward from a case structure 70. It should be understood that any number of stages may be used in the example high pressure turbine section 54. Moreover, the disclosed airfoils may be used in the compressor section or in the low pressure turbine 46.

Each blade in the first and second array of blades 60, 62 includes an airfoil 72 that extends from a platform 74 towards a free end at a blade tip 76. The blade tip 76 is located adjacent a blade outer air seal 78 that is supported by the case structure 70. The blade outer air seals 78 provide an outer boundary of the core flow path C and the platform 74 provides an inner boundary of the core flow path C. The first and second arrays of the blades 60, 62 are operatively connected to the high speed spool 32, for example.

The array of vanes 68 include individual vanes having airfoils 80 that extend between a radially inner platform 82 and a radially outer platform 84 that define the core flow path C. The airfoil 80 includes a pressure side 80P (predominantly concave—FIG. 2) and a suction side 80S (predominantly convex—FIG. 3) extending between a leading edge 86 and a trailing edge 88.

The radially inner platform includes a radially outer side 820 and a radially inner side 821 and the radially outer platform 84 includes a radially inner side 841 and a radially outer side 840. The radially outer side 820 and the radially inner side 841 at least partially defining the core flow path C. The radially outer side 84B includes hooks 90 that secure the array of vanes 68 relative to the case structure 70. It should be understood that the array of vanes 68 may be discrete from one another, arranged in integrated clusters of vanes, or a continuous ring of vanes. In this disclosure, axial, axially, circumferential, circumferentially, radial, or radially are in relation to the engine axis A unless stated otherwise.

Figure 3:
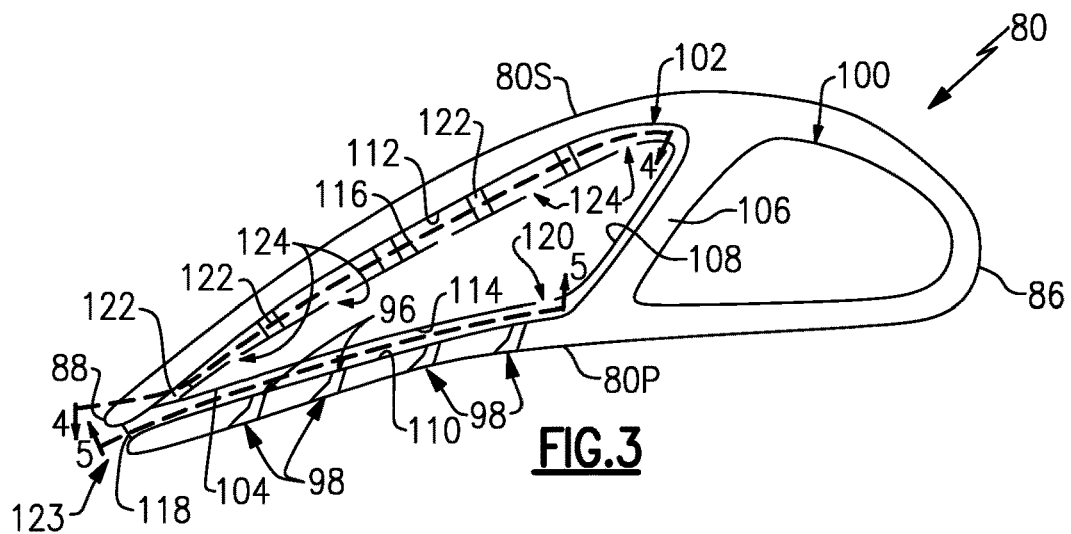
FIG. 3 is a cross-sectional view of an example airfoil taken along line 3-3 of FIG. 2.

As shown in FIG. 3, each airfoil 80 includes a leading edge feed cavity 100 adjacent the leading edge 86 and a trailing edge feed cavity 102 adjacent the trailing edge 88. The trailing edge cavity 102 includes a baffle 104 for delivering cooling airflow to the airfoil through a center cavity of the baffle 104. In the illustrated example, the baffle 104 is of similar shape to the trailing edge cavity 102 where it is contained and includes a forward wall portion 108 adjacent a wall 106 separating the leading edge cavity 100 from the trailing edge cavity 102. The forward wall portion 108 is in close proximity to or in abutting contact with the wall 106 to prevent cooling airflow or other airflow from passing between the forward wall portion 108 and the wall 106.

The trailing edge cavity 102 also includes a pressure sidewall 110 and a suction sidewall 112 adjacent the pressure side 80P and the suction side 80S, respectively, of the airfoil 80. The baffle 104 includes a pressure sidewall 114 and a suction sidewall 116 spaced from the pressure sidewall 110 and the suction sidewall 112, respectively. The pressure sidewall 114 and the suction sidewall 116 intersect at a downstream end of the baffle 104 and intersect opposing edges of the forward wall portion 106 at an upstream end of the baffle 104. The pressure sidewall 110 includes film cooling openings 96 in fluid communication with film cooling passages 98 that extend through the pressure side 80P of the airfoil 80 to provide film cooling along the pressure side 80P of the airfoil 80. In the illustrated example, the film cooling passages 98 includes a metering portion adjacent the pressure sidewall 110 and a diffusion portion adjacent the pressure side 80P.

Figure 5:
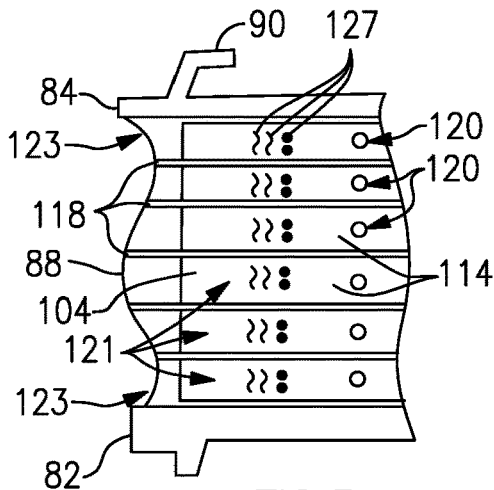
FIG. 5 is a cross-sectional view taken along line 5-5 of FIG. 3.

As shown in FIGS. 3 and 5, the pressure sidewall 114 of the baffle 104 is spaced from the pressure sidewall 110 of the airfoil 80 by ribs 118 that extend in an axial direction generally parallel to the engine axis A. The pressure sidewall 114 of the baffle 104 includes multiple pressure side cooling openings 120 that extend through the baffle 104. The pressure side cooling openings 120 are axially aligned and radially spaced from each other. At least one of the pressure side cooling openings 120 is in fluid communication with a pressure side cooling passage 121. The pressure side cooling passage 121 is defined by the pressure side 114 of the baffle, the pressure sidewall 110, and the ribs 118 extending from the pressure sidewall 110. The pressure side cooling passage 121 includes flow disrupting features 127, such as trip strips or pedestals. In the illustrated embodiment, the pressure side cooling passage 121 feed a trailing edge cooling passage 123.

Figure 4:
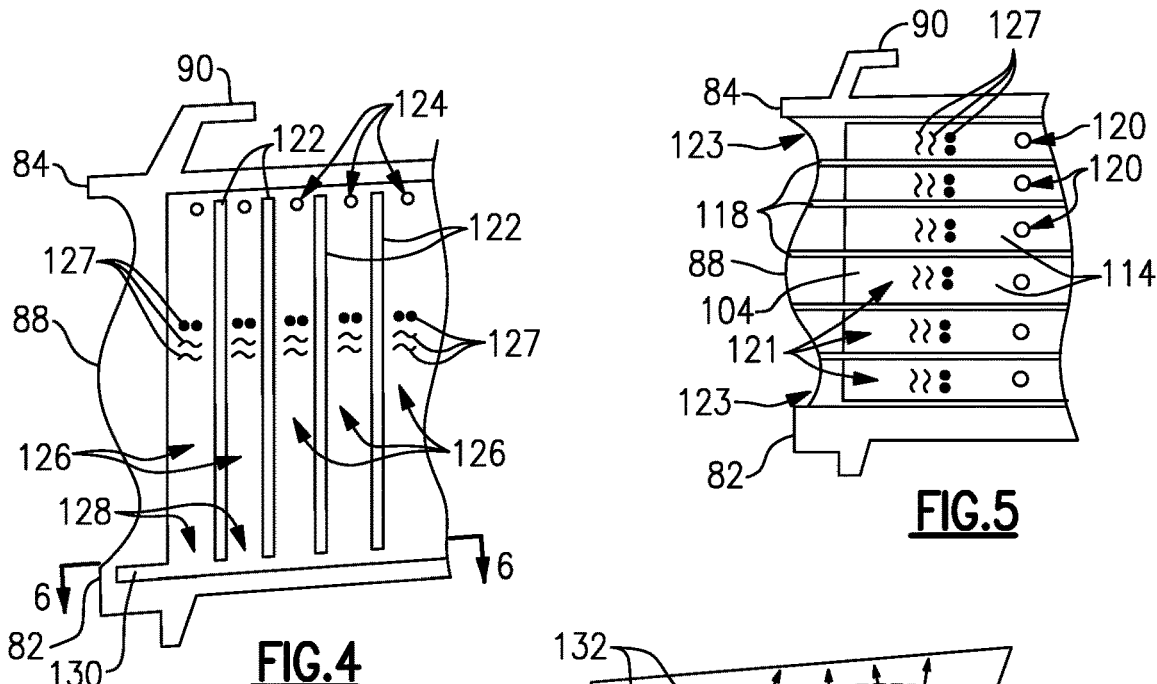
FIG. 4 is a cross-sectional view taken along line 4-4 of FIG. 3.

As shown in FIGS. 3 and 4, the suction sidewall 116 of the baffle 104 is spaced from the suction sidewall 112 of the airfoil 80 by ribs 122 that extend generally in a radial direction perpendicular to the engine axis A. The suction sidewall 116 of the baffle 104 includes multiple suction side cooling openings 124 that extend through the baffle 104. The suction side cooling openings 124 are radially aligned and axially spaced from each other. All of the suction side cooling openings 124 are in fluid communication with a suction side cooling passage 126 defined by the suction sidewall 112 of the baffle 104, the suction sidewall 112, and the ribs 122 extending from the suction sidewall 116. A trailing edge of the baffle 104 engages a downstream most rib 122 to provide limited fluid communication with the trailing edge of airfoil 80. The suction side cooling passage 126 includes flow disrupting features 127, such as trip strips or pedestals.

Figure 6:
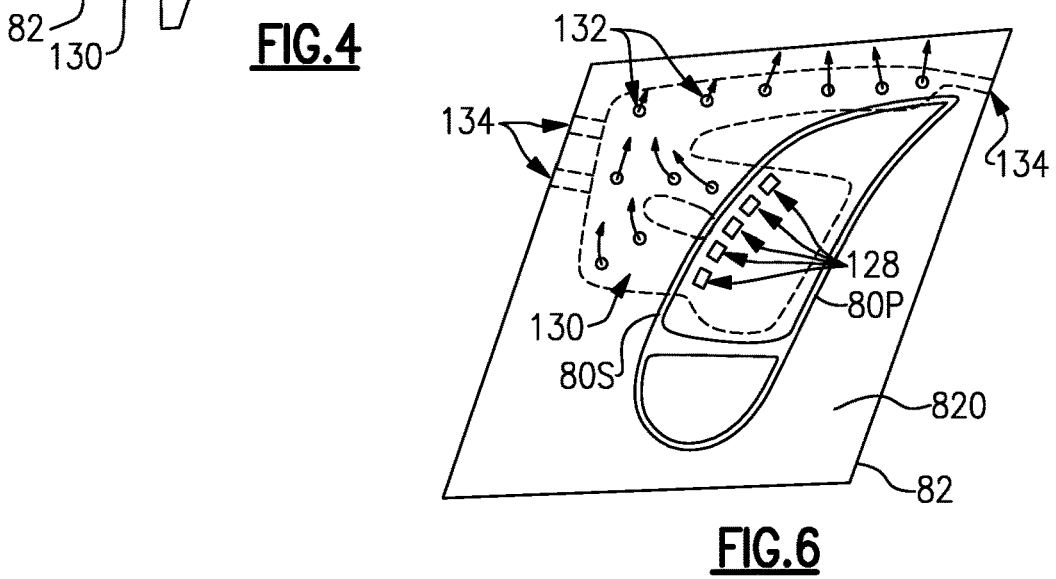
FIG. 6 is a cross-sectional view taken along line 6-6 of FIG. 2.

As shown in FIGS. 4 and 6, the radially inner platform 82 includes a platform cooling passage 130 fed by outlets 128 in the suction side cooling passages 126. The platform cooling passage 130 is in fluid communication with platform cooling holes 132 on a radially outer side 820 of the radially inner platform 82. The platform cooling passage 130 is also in fluid communication with edge cooling passages 134 adjacent circumferential edges of the radially inner platform 82. Although cooling airflow travels radially inward from the suction side cooling openings 124 through the outlets 128 into the platform cooling passage 130 in the radially inner platform 82 in the illustrated embodiment, the cooling airflow could travel radially outward and the platform passage 130 could be located in the radially outer platform 84. The platform cooling passage may be integral to the platform, or may be formed by the attachment of a sheet metal coverplate isolating the cooling passage from the platform supply air.

Figure 7:
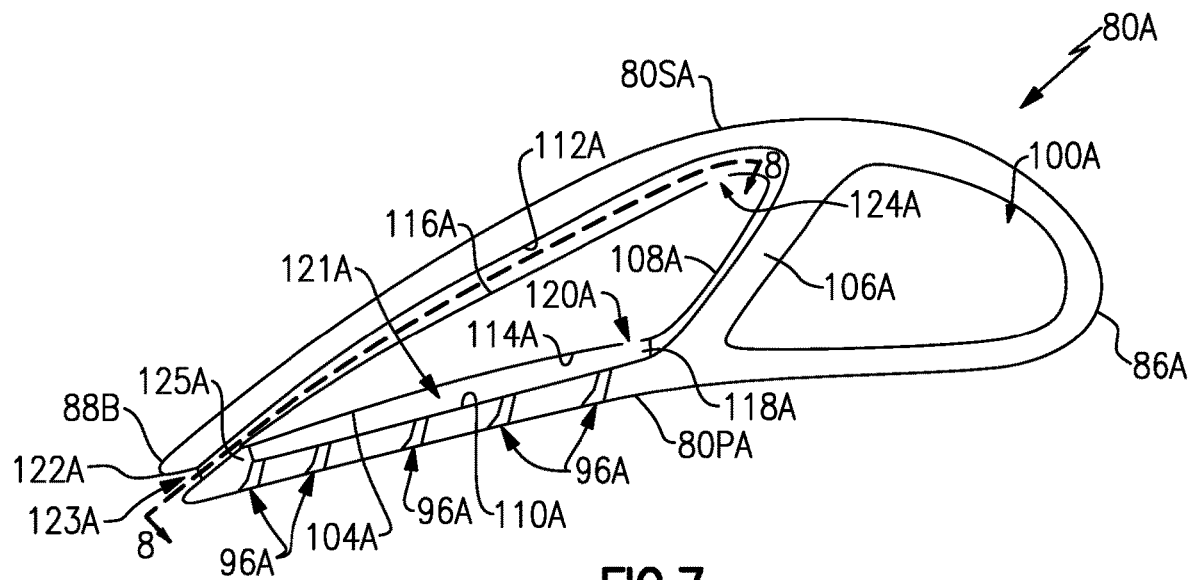
FIG. 7 is a cross-sectional view of another example airfoil.
Figure 8:
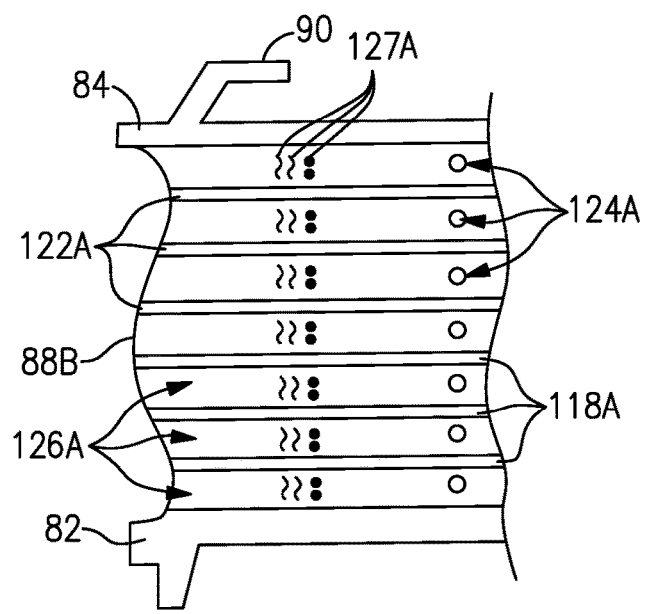
FIG. 8 is a cross-sectional view taken along line 8-8 of FIG. 7.

FIGS. 7 and 8 illustrate another example airfoil 80A and baffle 104A similar to the airfoil 80 and the baffle 104, respectively, above except where described below or shown in the Figures. As shown in FIG. 7, each vane 80A includes a leading edge feed cavity 100A adjacent a leading edge 86A and a trailing edge cavity 102A adjacent a trailing edge 88A. The trailing edge cavity 102A includes a baffle 104A. The baffle 104A is wedge shaped and includes a forward wall portion 108A adjacent a wall 106A separating the leading edge cavity 100A from the trailing edge cavity 102A. The forward wall portion 108A is in close or abutting contact with the wall 106A to prevent cooling airflow or other airflow from passing between the forward wall portion 108A and the wall 106A.

The trailing edge cavity 102A also includes a pressure sidewall 110A and a suction sidewall 112A adjacent a pressure side 80PA and a suction side 80SA, respectively. The baffle 104A includes a pressure sidewall 114A and a suction sidewall 116A spaced from the pressure sidewall 110A and the suction sidewall 112A. The pressure sidewall 110A includes film cooling openings 96A in fluid communication with film cooling passages 98A that extend through the pressure side 80PA of the airfoil 80A to provide film cooling along the pressure side 80PA of the airfoil 80A. In the illustrated example, the film cooling passages 98A includes a metering portion adjacent the pressure sidewall 110A and a diffusion portion adjacent the pressure side 80PA.

The pressure sidewall 114A of the baffle 104 is spaced from the pressure sidewall 110A of the airfoil 80A by ribs 118A that extend in an axial direction generally parallel to the engine axis A similar to the airfoil 80 described above. The pressure sidewall 114A of the baffle 104A includes multiple pressure side cooling openings 120A that extend through the baffle 104A similar to the multiple pressure side cooling openings 120 described above. At least one of the pressure side cooling openings 120A are in fluid communication with a pressure side cooling passage 121A defined by the pressure side 114 of the baffle 104A, the pressure sidewall 110A, and the ribs 118A. Unlike the pressure side cooling passages 121 described above, the pressure side cooling passages 121A do not feed a trailing edge cooling passage but rather terminate at a rib 125A at an axially downstream end.

The suction sidewall 116A of the baffle 104A is spaced from the suction sidewall 112A of the airfoil 80 by ribs 122A that extend generally in an axial direction generally parallel to the engine axis A. The suction sidewall 116A of the baffle 104A includes multiple suction side cooling openings 124A that extend through the baffle 104A. At least one of the suction side cooling openings 124A are in fluid communication with a suction side cooling passage 126A defined by the suction sidewall 116A of the baffle 104A, the suction sidewall 112A, and the ribs 122A. The suction side cooling passage 126A includes flow disrupting features 127A, such as trip strips or pedestals. The suction side cooling openings 124A are spaced radially from each other. The suction side cooling passages 126A also feed a trailing edge cooling passage 123A. The airfoil 80A does not include a platform cooling passage fed by the suction side cooling passages 126A as described above for the airfoil 80.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine component comprising:
an airfoil including a trailing edge feed cavity; and
a baffle located in the trailing edge feed cavity including a plurality of pressure side cooling openings in fluid communication with a corresponding one of a plurality of pressure side cooling passages and a plurality of suction side cooling openings in fluid communication with a corresponding one of a plurality of suction side cooling passages, wherein the plurality of suction side cooling passages extend between opposing radial ends of the airfoil and the airfoil includes a leading edge feed cavity separated by a wall of the component from the trailing edge cavity, the plurality of suction side cooling passages are at least partially defined by the baffle, a suction sidewall of the airfoil, and at least one rib extending from the suction sidewall of the airfoil, and the airfoil includes at least one trailing edge cooling hole in fluid communication with at least one of the plurality of pressure side cooling passages; and
a plurality of pressure side cooling holes extending through a pressure side of the airfoil in fluid communication with at least one of the plurality of pressure side cooling passages and the plurality of pressure side cooling passages extend in an axial direction.

2. The gas turbine engine component of claim 1, further comprising a platform supporting the airfoil having a platform cooling passage in fluid communication with at least one of the plurality of suction side cooling passages.

3. The gas turbine engine component of claim 2, wherein the platform cooling passage is in fluid communication with a plurality of platform cooling holes.

4. The gas turbine engine component of claim 1, wherein the plurality of suction side cooling passages extend in an axial direction having an inlet to the suction side cooling passage upstream of an outlet to the suction side cooling passage.

5. The gas turbine engine component of claim 4, wherein the plurality of suction side cooling openings are at least partially defined by the baffle, a suction sidewall of the airfoil, and at least one rib extending from the suction sidewall of the airfoil.

6. The gas turbine engine component of claim 5, wherein the airfoil includes at least one trailing edge cooling hole in fluid communication with at least one of the plurality of suction side cooling passages.

7. The gas turbine engine component of claim 6, further comprising a plurality of pressure side cooling holes extending through a pressure side of the airfoil in fluid communication with at least one of the plurality of pressure side cooling passages.

8. A gas turbine engine comprising:
a compressor section;
a combustor section in fluid communication with said compressor section;
a turbine section in fluid communication with said combustor section; and
wherein one of the compressor section or the turbine section includes at least one component including:
an airfoil including a trailing edge feed cavity;
a baffle located in the trailing edge feed cavity including a plurality of pressure side cooling openings in fluid communication with a corresponding one of a plurality of pressure side cooling passages and a plurality of suction side cooling openings in fluid communication with a corresponding one of a plurality of suction side cooling passages, wherein the airfoil includes at least one trailing edge cooling hole in fluid communication with at least one of the plurality of suction side cooling passages;
a platform supporting the airfoil having a platform cooling passage in fluid communication with at least one of the plurality of suction side cooling passages; and
a plurality of pressure side cooling holes extending through a pressure side of the airfoil in fluid communication with at least one of the plurality of pressure side cooling passages and the plurality of pressure side cooling passages extend in an axial direction.

9. The gas turbine engine of claim 8, further comprising a platform supporting the airfoil and having a platform cooling passage in fluid communication with at least one of the plurality of suction side cooling passages.

10. The gas turbine engine of claim 9, wherein the airfoil includes at least one trailing edge cooling hole in fluid communication with at least one of the plurality of suction side cooling passages.

11. The gas turbine engine of claim 8, wherein the plurality of suction side cooling passages extend in an axial direction and each have an inlet upstream of an outlet.

12. The gas turbine engine of claim 11, wherein the plurality of suction side cooling openings are at least partially defined by the baffle, a suction sidewall of the airfoil, and at least one rib extending from the suction sidewall of the airfoil.

13. The gas turbine engine of claim 12, wherein the airfoil includes at least one trailing edge cooling hole in fluid communication with at least one of the plurality of suction side cooling passages.

* * * * *